United States Patent
Douady et al.

(10) Patent No.: US 9,909,424 B2
(45) Date of Patent: Mar. 6, 2018

(54) ASSEMBLY OF A BALANCE WEIGHT WITH A ROTOR ELEMENT

(71) Applicant: SNECMA, Paris (FR)

(72) Inventors: Cyril Douady, Bondoufle (FR); Claude Gerard Rene Dejaune, Boissise la Bertrand (FR)

(73) Assignee: SNECMA, Paris (FR)

( * ) Notice: Subject to any disclaimer, the term of this patent is extended or adjusted under 35 U.S.C. 154(b) by 244 days.

(21) Appl. No.: 14/762,065

(22) PCT Filed: Jan. 23, 2014

(86) PCT No.: PCT/FR2014/050125
§ 371 (c)(1),
(2) Date: Jul. 20, 2015

(87) PCT Pub. No.: WO2014/114883
PCT Pub. Date: Jul. 31, 2014

(65) Prior Publication Data
US 2015/0322794 A1 Nov. 12, 2015

(30) Foreign Application Priority Data

Jan. 25, 2013 (FR) .................................... 13 50655

(51) Int. Cl.
*F01D 5/02* (2006.01)
*F01D 5/06* (2006.01)
*F16F 15/34* (2006.01)

(52) U.S. Cl.
CPC ............ *F01D 5/066* (2013.01); *F01D 5/027* (2013.01); *F16F 15/34* (2013.01);
(Continued)

(58) Field of Classification Search
CPC ...... F01D 5/027; F01D 5/066; F05D 2230/64; F05D 2260/30; F05D 2260/31; F05D 2260/96; F16F 15/34
See application file for complete search history.

(56) References Cited

U.S. PATENT DOCUMENTS 4,220,055 A * 9/1980 Dubois ................... F01D 5/027
464/180
4,480,958 A * 11/1984 Schlechtweg ........... F01D 5/326
416/219 R (Continued)

FOREIGN PATENT DOCUMENTS

DE 10 2009 042 831 A1 4/2010
EP 0 691 455 A1 1/1996
(Continued)

OTHER PUBLICATIONS

International Search Report dated Mar. 21, 2014, in PCT/FR2014/050125, filed Jan. 23, 2014.
(Continued)

Primary Examiner — Mark Laurenzi
Assistant Examiner — Xiaoting Hu
(74) Attorney, Agent, or Firm — Oblon, McClelland, Maier & Neustadt, L.L.P.

(57) ABSTRACT

The balance weight is fixed to the flange of a rotor element by a pre-fixing screw with a conical head engaged into a conical counterbore having a shape complementary to the flange, which places the weight at a very accurate position before permanently fixing it by a clamping stud.

7 Claims, 5 Drawing Sheets

(52) U.S. Cl.
CPC ...... *F05D 2230/64* (2013.01); *F05D 2260/30* (2013.01); *F05D 2260/31* (2013.01); *F05D 2260/96* (2013.01)

(56) References Cited

U.S. PATENT DOCUMENTS

| | | | |
|---|---|---|---|
| 5,577,887 A | 11/1996 | Gouyon et al. | |
| 8,506,253 B2 * | 8/2013 | Lecuyer | F01D 5/027 416/145 |
| 2004/0156708 A1 * | 8/2004 | Allam | B23P 6/002 415/144 |
| 2005/0238423 A1 * | 10/2005 | Maffre | F01D 5/066 403/408.1 |
| 2006/0245925 A1 * | 11/2006 | Brault | F01D 5/027 416/144 |
| 2007/0059164 A1 * | 3/2007 | Brault | F01D 5/027 415/174.5 |
| 2008/0095613 A1 * | 4/2008 | Blanchard | F01D 5/027 415/140 |
| 2009/0304509 A1 * | 12/2009 | Blanchard | F01D 5/027 416/144 |
| 2013/0236310 A1 * | 9/2013 | Billings | F01D 5/027 416/144 |

FOREIGN PATENT DOCUMENTS

| | | |
|---|---|---|
| EP | 1 717 481 A1 | 11/2006 |
| EP | 1 918 512 A2 | 5/2008 |
| FR | 2 404 212 A1 | 4/1979 |

OTHER PUBLICATIONS

French Preliminary Search Report dated Jan. 22, 2014, in Patent Application No. FR 13 50655, filed Jan. 25, 2013.

* cited by examiner

ASSEMBLY OF A BALANCE WEIGHT WITH A ROTOR ELEMENT

The object of the invention is an improved assembly of a balance weight with a rotor element.

Balancing rotors is systematically necessary to ensure their proper operation and the service life of machines to which they belong. In rotors made of several assembled modules, balancing is made on each module.

Figure 8:
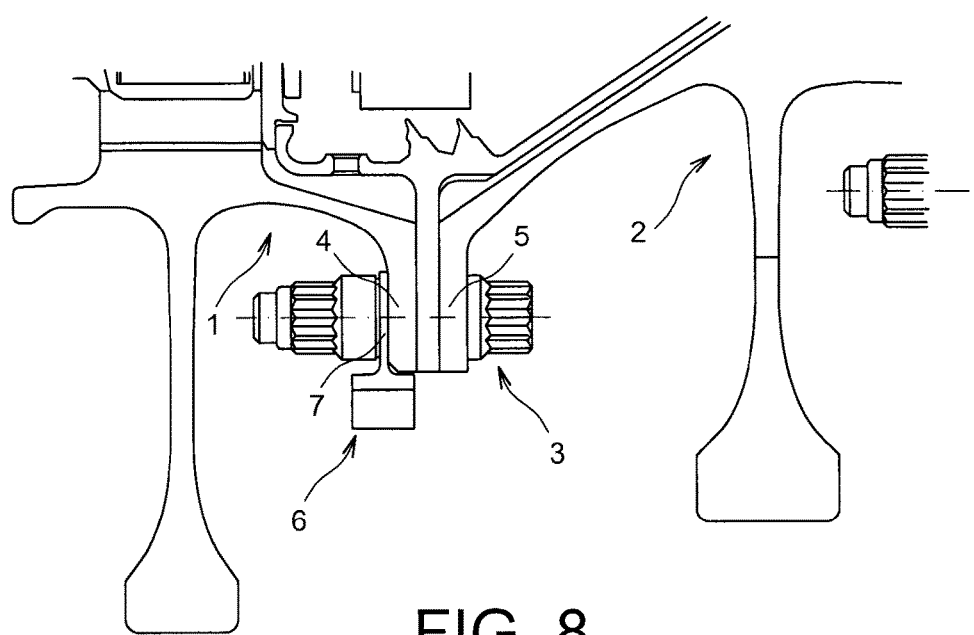

An exemplary device for carrying out a balancing is described in FIG. 8, which represents the assembly of two rotor elements 1 and 2 by assembly studs 3, set up through flanges 4 and 5 adjacent to these modules 1 and 2. A weight 6 is fixed to a leg 7 through which the stud 3 also passes, and it hangs inside the rotor, protruding towards the rotational axis. Such weights 6 can be distributed along the rotor circumference, only one being represented here.

Certain limitations of this design are that the balancing can remain inaccurate due to uncertainties regarding the real position of the weight 6, and that the overall dimension of the weight 6 can turn out to be unacceptable if the modules 1 and 2 have too small a diameter.

The invention represents an assembly for fixing an improved balance weight according to these criteria, and which enables in particular the weights to be placed with a great accuracy.

In general terms, it relates to an assembly of a balance weight with a rotor element, comprising a device for fixing the weight, passing through the weight and a flange of the element, characterised in that it comprises a pre-fixing screw of the weight with a conical head, the pre-fixing screw extending through a drilling of the flange (9) and into the weight, the drilling being provided with a conical counterbore at a face opposite to the weight, the conical counterbore accommodating the conical head.

The combination of the conical head screw and the conical counterbore ensures an accurate position of the screw with respect to the flange, and consequently of the weight which is fixed thereto. Pre-fixing occurs before assembling the rotor elements to each other and can therefore be easily carried out, even with small diameter elements, or elements with very little free space around the weight once assembled.

Permanent fixing of the weight can be reached as in the prior design, by resorting to studs for assembling the flange of the element to a flange of a neighbouring element of the rotor; in the present case, the studs can however be fitted with legs for clamping the weight.

Scalloping the flange is possible, in order to relieve it at the location where the pre-fixing screw and studs assembly holes are drilled, by avoiding stress concentrations.

Figure 1:
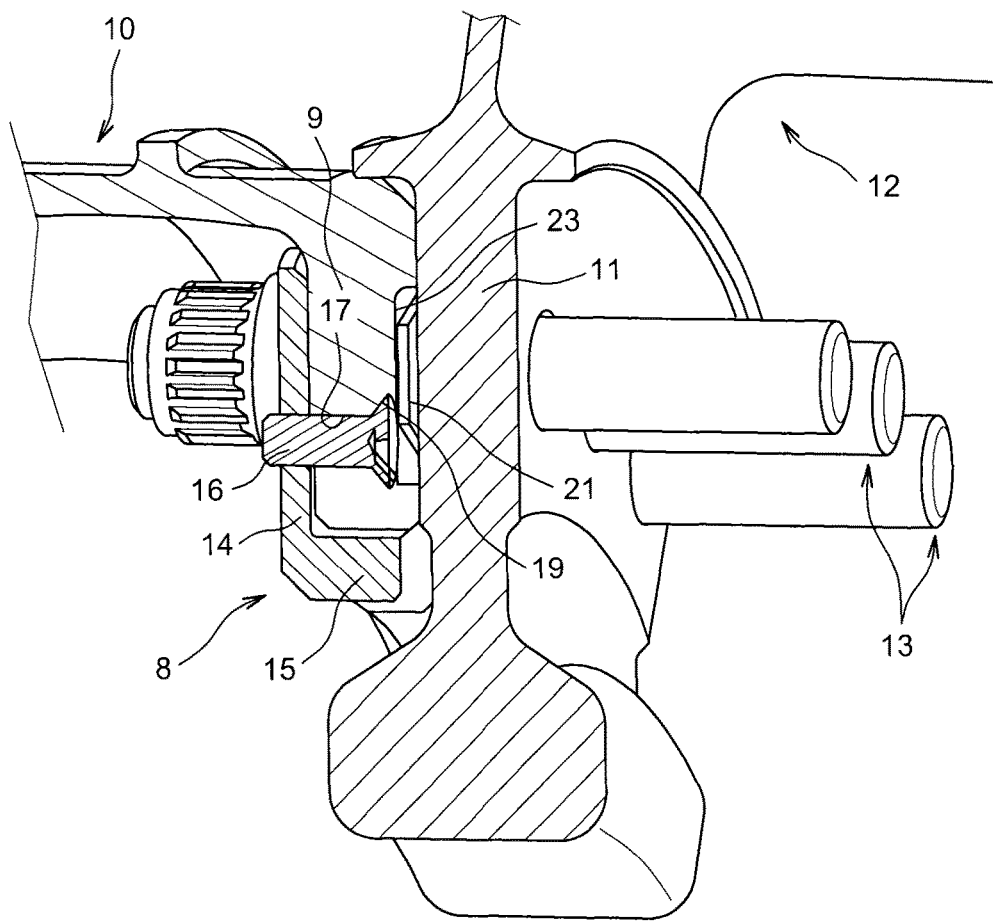
Figure 2:
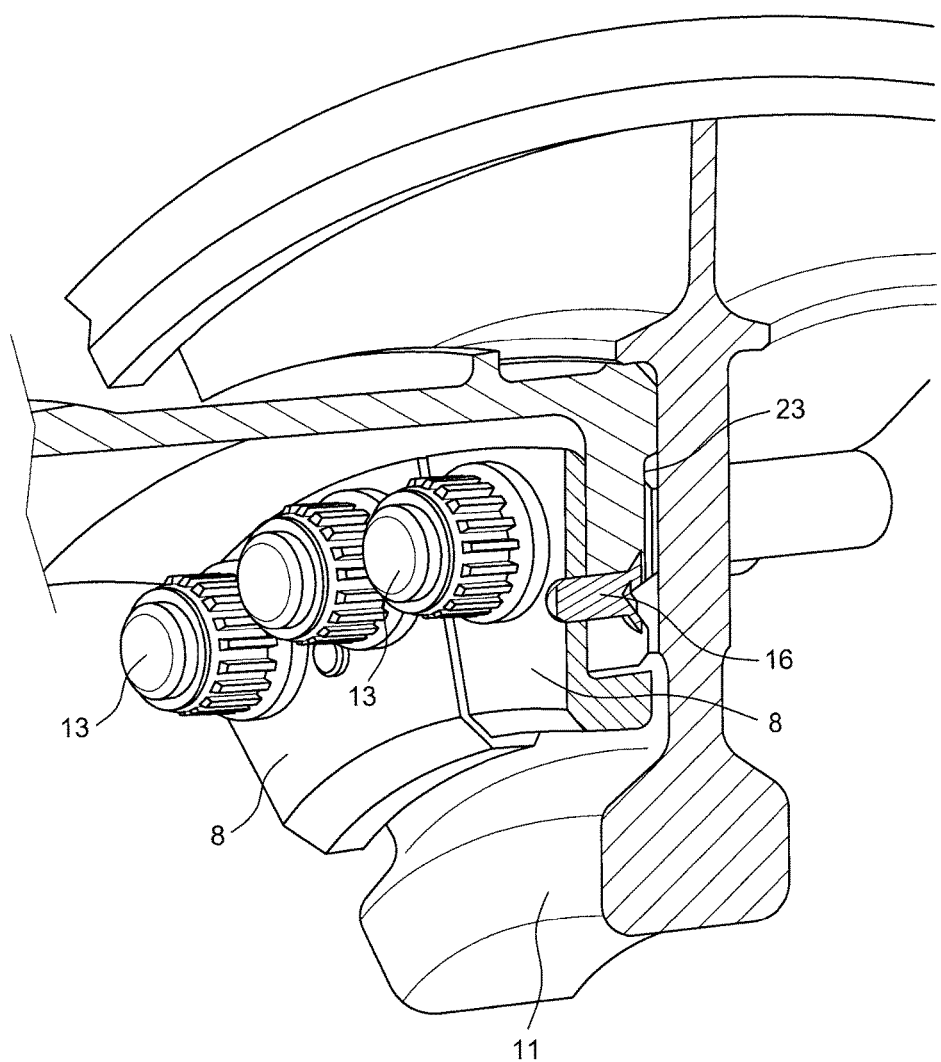
Figure 3:
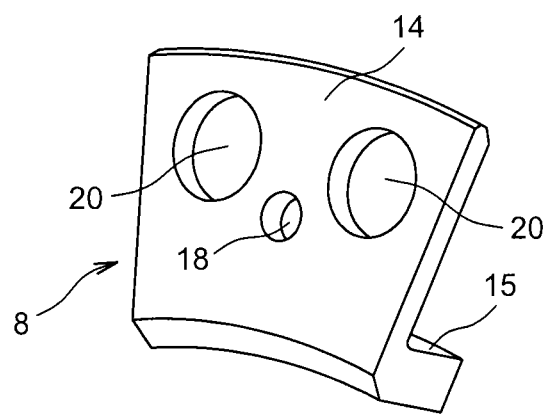
Figure 4:
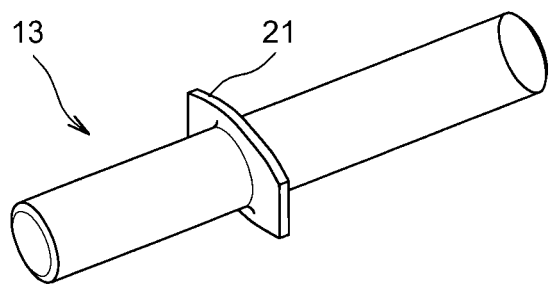
Figure 5:
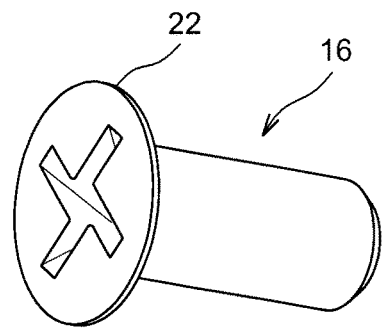
Figure 6:
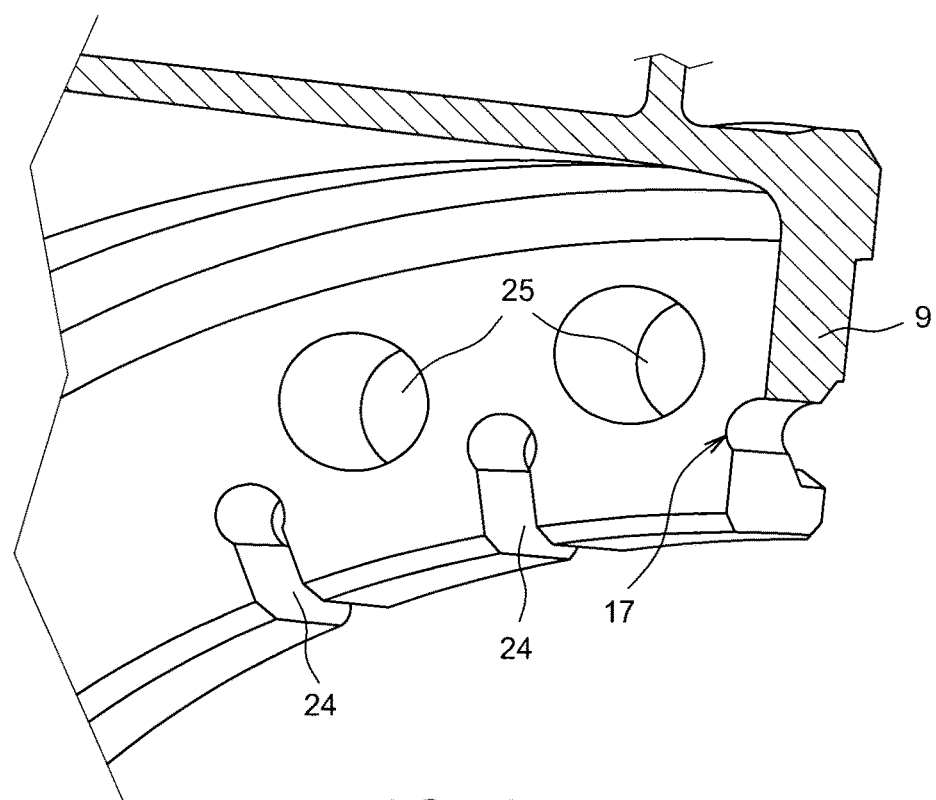
Figure 7:
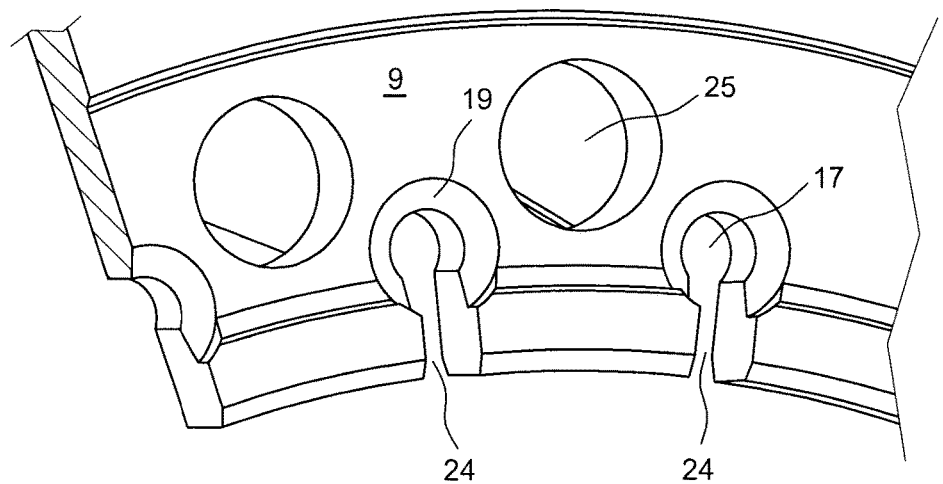

The invention will now be described in relation to the following figures:

FIGS. 1 and 2 are two general views of the assembly,

FIGS. 3, 4, and 5 respectively depict a balance weight, a fixing stud, and a pre-fixing screw, FIGS. 6 and 7 depict the flange scalloping, and FIG. 8 described above, depicts a prior art assembly arrangement.

The weight 8 of the invention is as previously fixed to a planar flange 9 of a rotor element 10; the flange 9 is fixed to a flange 11 adjacent to a neighbouring element 12 of the rotor by assembly studs 13. The studs 13 are threaded rods fitted with clamping nuts at both ends (only one is here represented) thereof.

FIG. 2 shows that several weights 8 can be mounted side by side on the flange 9. The weight 8 or each weight 8 is herein formed by a plate 14 held on the flange 9 and by an edge 15, conferring on it a bent section and extending inside the flange 9, towards the flange 11 of the other element 12.

The device comprises, for each weight 8, a pre-fixing screw 16 with a cylindrical rod and a countersunk head which is a conical head 22. The pre-fixing screw 16 passes through the flange 9 through a drilling 17 and the rod end extends into an internal thread 18 passing through the plate 14 of the weight 8. Clamping the pre-fixing screw 16 therefore holds the plate 14 to the flange 9. The drilling 17 is fitted with a conical counterbore 19 into which the conical head 22 having a complementary shape is housed, which places the screw rod and the weight 8 at a determined position with a great accuracy.

The studs 13 pass through drillings 20 set up throughout the weight 8 and both flanges 9 and 11 (FIG. 3). The studs 13 have a leg 21 of approximately a mid-length. The leg 21 flushing against the flange 11 and enables the plate 14 to be securely clamped against the flange 9 once the elements 10 and 12 are assembled with each other. It presses against the flange 11 on a side opposite to the weight 8.

The flange 9 comprises a housing 23 at the location of each pre-fixing screw 16, into which the drilling 17 opens, and which also accommodates the leg 21. Any risk of contact between the heads 22 and the flange 11 is then avoided and an easy and proper assembly is ensured.

FIGS. 6 and 7 depict that the flange 9 is fitted with a scalloping 24, mainly notches distributed along its circumference and which extend from its inner radius to the drillings 17. Their effect is to reduce the amplitude and gradient of the stresses in the vicinity of the drillings 17 and 25, and therefore to generally relieve the flange 9 and prolong its service life.

The drillings 25 of the flange 9 which are intended for passing the studs 13 are also represented in these FIGS. 6 and 7. The design of the invention is compatible with any number of weights 8 and also any number, which can be greater, of drillings 17 and scalloping radial notches 24 as a function of the number of the drilling 25. The drillings 17 and the scalloping notches 24 are here evenly distributed along the circumference of the flange 9 by alternating with the drillings 25 of the studs 13.

The invention claimed is:

1. An assembly of a balance weight with a rotor element, comprising a device for fixing the weight passing through the weight and a flange of the element, and a pre-fixing screw of the weight with a conical head, the pre-fixing screw extending through a drilling in the flange and into the weight, the drilling being provided with a conical counterbore at a face of the flange opposite to the weight, the conical counterbore accommodating the conical head,
    wherein the device for fixing the weight is a stud for assembling the flange with a flange of a neighbouring rotor element.

2. The assembly of the balance weight according to claim 1, wherein the stud comprises a leg flushing against the flange of the neighbouring rotor element on an opposite side of the weight.

3. The assembly of the balance weight according to claim 2, wherein the flange of the element comprises a housing into which the conical counterbore opens and which accommodates the conical head and the leg.

4. The assembly of the balance weight according to claim 1, wherein the flange of the element is fitted with a scalloping including a radial notch joining an inner edge of the flange to the drilling.

5. An assembly of a balance weight with a rotor element, comprising:
- the balance weight fixed to a first flange of the rotor element;
- a first assembly device configured to fix the first flange to a second flange of a neighbouring rotor element, wherein the first assembly device passes through the weight; and
- a second assembly device having a rod and a countersunk head, wherein the second assembly device passes through the first flange but not the second flange, wherein the rod extends through the weight, and wherein the second assembly device is configured to hold the weight against the first flange.

6. The assembly according to claim 5, wherein the second assembly device is a pre-fixing screw.

7. The assembly according to claim 6, wherein the first assembly device is a stud.

* * * * *